(12) United States Patent
Kline et al.

(10) Patent No.: US 9,058,190 B2
(45) Date of Patent: Jun. 16, 2015

(54) COMPARING SYSTEM ENGRAM WITH PRODUCT ENGRAM TO DETERMINE COMPATIBILITY WITH SYSTEM

(75) Inventors: Eric V. Kline, Rochester, MN (US); Gabriel L. M. Kline, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 13/168,955

(22) Filed: Jun. 25, 2011

(65) Prior Publication Data

US 2012/0331458 A1 Dec. 27, 2012

(51) Int. Cl.
*G06F 9/44* (2006.01)
*G06F 9/445* (2006.01)
*G06Q 10/06* (2012.01)

(52) U.S. Cl.
CPC . *G06F 9/445* (2013.01); *G06F 8/61* (2013.01); *G06F 8/65* (2013.01); *G06F 8/71* (2013.01); *G06F 8/60* (2013.01); *G06Q 10/06* (2013.01)

(58) Field of Classification Search
CPC ............. G06F 8/60; G06F 8/61; G06F 8/65; G06F 8/67; G06F 8/07
See application file for complete search history.

(56) References Cited

U.S. PATENT DOCUMENTS

| | | | |
|---|---|---|---|
| 6,898,768 B1 * | 5/2005 | Theodossy et al. | 716/111 |
| 6,922,831 B1 * | 7/2005 | Kroening et al. | 717/172 |
| 7,424,719 B2 * | 9/2008 | Duplichan | 717/174 |
| 7,537,158 B1 * | 5/2009 | Cox et al. | 235/385 |
| 7,673,052 B2 * | 3/2010 | Fried et al. | 709/226 |
| 7,735,079 B1 * | 6/2010 | Davis et al. | 717/174 |
| 7,743,365 B2 | 6/2010 | Wehrs et al. | |
| 7,792,941 B2 * | 9/2010 | Fried et al. | 709/223 |
| 7,882,221 B2 * | 2/2011 | Sailer et al. | 709/224 |
| 7,956,749 B2 * | 6/2011 | Hartwig et al. | 340/572.1 |
| 7,984,436 B1 * | 7/2011 | Murray | 717/175 |
| 8,078,909 B1 * | 12/2011 | Satish | 714/15 |
| 8,146,075 B2 * | 3/2012 | Mahajan | 717/170 |
| 8,194,985 B2 * | 6/2012 | Grigsby et al. | 382/218 |
| 8,209,528 B2 * | 6/2012 | Rogers et al. | 713/2 |

(Continued)

OTHER PUBLICATIONS

Karimpour et al., "Bi-criteria Genetic Search for Adding New Features into an Existing Product Line", 2013 IEEE, CMSBSE 2013, San Francisco, CA, pp. 34-38; <http://ieeexplore.ieee.org/stamp/stamp.jsp?tp=&arnumber=6604434>.*

(Continued)

*Primary Examiner* — Thuy Dao
*Assistant Examiner* — Ben C Wang
(74) *Attorney, Agent, or Firm* — Damion Josephs (57) ABSTRACT

A system engram encoding an existing configuration of a target system is received. The existing configuration includes one or more of hardware and software of the target system. The system engram is originally acquired by a first processing device and is received by a second processing device. The second processing device compares the system engram with a product engram encoding a required configuration of the target system for a product to be compatibly installed in relation to the target system. The required configuration includes one or more of required hardware and required software within the target system for the product to be compatibly installed in relation to the target system. The second processing device can output, as compatibility information of the product with the target system, results of comparison of the system engram with the product engram.

14 Claims, 6 Drawing Sheets

(56) References Cited

U.S. PATENT DOCUMENTS

| | | | |
|---|---|---|---|
| 8,365,161 B2* | 1/2013 | Komano | 717/174 |
| 8,713,560 B2* | 4/2014 | Neumann et al. | 717/174 |
| 8,725,839 B2* | 5/2014 | Madduri et al. | 717/174 |
| 2002/0082858 A1* | 6/2002 | Heddaya et al. | 705/1 |
| 2003/0227477 A1 | 12/2003 | Kadiwala | |
| 2005/0011958 A1* | 1/2005 | Fukasawa et al. | 235/462.46 |
| 2006/0020922 A1* | 1/2006 | Takizawa | 717/168 |
| 2006/0020992 A1* | 1/2006 | Pugel et al. | 725/108 |
| 2006/0168576 A1* | 7/2006 | Phung et al. | 717/168 |
| 2008/0022272 A1* | 1/2008 | Komano | 717/170 |
| 2008/0048044 A1* | 2/2008 | Zhao et al. | 235/494 |
| 2008/0127161 A1* | 5/2008 | Atas et al. | 717/168 |
| 2008/0228503 A1 | 9/2008 | Buchheit | |
| 2008/0235372 A1* | 9/2008 | Sailer et al. | 709/224 |
| 2008/0269938 A1* | 10/2008 | Meaney et al. | 700/116 |
| 2009/0132388 A1* | 5/2009 | Omori et al. | 705/27 |
| 2009/0144719 A1* | 6/2009 | Pazdziora | 717/171 |
| 2009/0228694 A1* | 9/2009 | Karstens | 713/1 |
| 2009/0259515 A1* | 10/2009 | Belimpasakis et al. | 705/10 |
| 2009/0271507 A1* | 10/2009 | Kodimer | 717/172 |
| 2009/0307487 A1* | 12/2009 | Movva et al. | 713/156 |
| 2010/0086192 A1* | 4/2010 | Grigsby et al. | 382/141 |
| 2010/0274998 A1* | 10/2010 | Rogers et al. | 713/2 |
| 2011/0154317 A1* | 6/2011 | Madduri et al. | 717/174 |
| 2011/0209133 A1* | 8/2011 | Mahajan et al. | 717/170 |
| 2011/0302201 A1* | 12/2011 | Ogaz et al. | 707/769 |
| 2012/0017205 A1* | 1/2012 | Mahajan | 717/170 |
| 2012/0163150 A1* | 6/2012 | Itagaki et al. | 369/85 |
| 2012/0183185 A1* | 7/2012 | Grigsby et al. | 382/128 |
| 2012/0303356 A1* | 11/2012 | Boyle et al. | 704/9 |
| 2012/0323729 A1* | 12/2012 | Kline | 705/26.8 |
| 2012/0331456 A1* | 12/2012 | Kline et al. | 717/174 |
| 2013/0060662 A1* | 3/2013 | Carlson et al. | 705/26.61 |
| 2013/0167135 A1* | 6/2013 | Neumann et al. | 717/174 |
| 2013/0185706 A1* | 7/2013 | Dominick | 717/168 |
| 2014/0123120 A1* | 5/2014 | Holmberg et al. | 717/168 |
| 2014/0189676 A1* | 7/2014 | Mahajan | 717/170 |
| 2014/0282395 A1* | 9/2014 | WANG et al. | 717/120 |

OTHER PUBLICATIONS

Durillo et al., "jMetal: A Java framework for multi-objective optimization", Jun. 12, 2011 Elsevier Ltd., pp. 760-771; <http://www.sciencedirect.com/science/article/pii/S0965997811001219#>.*

Cisco, "Researching In Service Software Upgrade Compatibility", Aug. 2007, Cisco Systems, Inc., pp. 1-4; <http://www.cisco.com/.../highavailability/prod_white_paper0900aecd80456d37.pdf>.*

Savaga et al., "Refactoring-Based Support for Binary Compatability in Evolving Frameworks", 2007 ACM, GPCE'07, Oct. 2007, Salzburg, Austria, pp. 175-184; <http://dl.acm.org/citation.cfm?...GUIDE&CFID=477181031&CFTOKEN=37040274>.*

Becker et al., "Automatically Determining Compatibility of Evolving Sciences", 2008 IEEE, ICSW'08, Sep. 2008, pp. 161-168; <http://ieeexplore.ieee.org/stamp.jsp?tp=&arnumber=4670172>.*

Yang et al., "A dynamic constraint satisfaction approach for configuring structural products under mass customization," Aug. 9, 2012, Elsevier Ltd., pp. 1723-1737.

Mendonca et al., "Decision-making coordination in collaborative product configuration," 2008 ACM, SAC'08, Mar. 16-20, 2008, Fortaleza, Ceara, Brazil, pp. 108-113.

Yang et al., "Applying constraint satisfaction approach to solve product configuration problems with cardinality-based configuration rules," 2011 Springer, pp. 99-111.

* cited by examiner

COMPARING SYSTEM ENGRAM WITH PRODUCT ENGRAM TO DETERMINE COMPATIBILITY WITH SYSTEM

RELATED APPLICATIONS

The present patent application is related to the patent application entitled "generation and comparison of engrams encoding information," assigned Ser. No. 13/168,956 and filed on Jun. 25, 2011, and which is hereby incorporated by reference.

BACKGROUND

It is commonplace for a user to want to install new software and/or upgrade existing software within an existing computing system, as well as install new hardware and/or upgrade existing hardware within such a computing system. For example, a user may wish to install a new computer program that provides functionality not provided by any existing software within a computing system, and/or upgrade an existing computer program already installed within the computing system with a newer version of this software. As another example, a user may wish to install a new hardware component that provides functionality not provided by any existing hardware within a computing system, and/or upgrade an existing hardware component already installed within the computing system with a different version of this hardware.

SUMMARY

A method of an embodiment of the invention receives a system engram encoding an existing configuration of a target system. The existing configuration includes one or more of hardware and software of the target system. The system engram is originally acquired by a first processing device and is received by a second processing device. The method includes comparing, by the second processing device, the system engram with a product engram. The product engram encodes a required configuration of the target system for a product to be compatibly installed in relation to the target system. The required configuration includes one or more of required hardware and required software within the target system for the product to be compatibly installed in relation to the target system. The method includes outputting, as compatibility information of the product with the target system, results of comparison of the system engram with the product engram, by the second processing device.

A system of an embodiment of the invention includes a processor, a computer-readable medium to store a computer program executable by the processor, and a receiving component. The receiving component is to receive a system engram encoding an existing configuration of a target system. The existing configuration includes one or more of hardware and software of the target system. The system engram is originally acquired by a processing device. The computer program is to compare the system engram with a product engram. The product engram encodes a required configuring of the target system for a product to be compatibly installed in relation to the target system. The required configuration includes one or more of required hardware and required software within the target system for the product to be compatibly installed in relation to the target system.

A computer program product of an embodiment of the invention includes a computer-readable storage medium having computer-readable code embodied therein. The computer-readable code is executable by a second processing device. The computer-readable code includes a first computer-readable code to receive a system engram encoding an existing configuration of a target system. The existing configuration includes one or more of hardware and software of the target system. The system engram is originally acquired by a first processing device. The computer-readable code includes a second computer-readable code to compare the system engram with a product engram. The product engram encodes a required configuration of the target system for a product to be compatibly installed in relation to the target system. The required configuration includes one or more of required hardware and required software within the target system for the product to be compatibly installed in relation to the target system.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a user may want to install new software and/or upgrade existing software within an existing computing system, as well as install new hardware and/or upgrade existing hardware within such a computing system. The new software, upgraded software, new hardware, and upgraded hardware can each be generically referred to as a product. To install such a product in relation to an existing system, the product has to be compatible with the existing system.

For instance, some types of processors are compatible only with certain types of motherboards. Therefore, a particular type of processor may not be able to be installed within a particular type of motherboard. As another example, some software is compatible only with certain types of operating systems, or within a particular type of operating system having a minimum version. In general, an existing system has a configuration, whereas a product has a required configuration that the existing system must satisfy in order for the product to be compatible with this system.

However, it is difficult for users to keep track of the configurations of their existing systems, and to know what required configurations products need to be compatibly installed within these existing systems. This is particularly the case for products that have required configurations that are complex. For example, a product may be compatible with a system that has a certain version of an operating system if there is also a sufficiently fast processor, but may still be compatible with a system that has an older version of this operating system if the processor is even faster still.

Embodiments of the invention alleviate a user from having to assess whether a product is compatible with a given target system. A system engram that encodes the existing configuration of the target system is received. The existing configuration includes the hardware and/or software of the target system. The system engram is compared with a product engram. The product engram encodes a required configuration of the target system for the product to be compatibly installed in relation to the target system. The product engram includes the hardware and/or software required within the target system for such compatible installation to occur.

Figure 1:
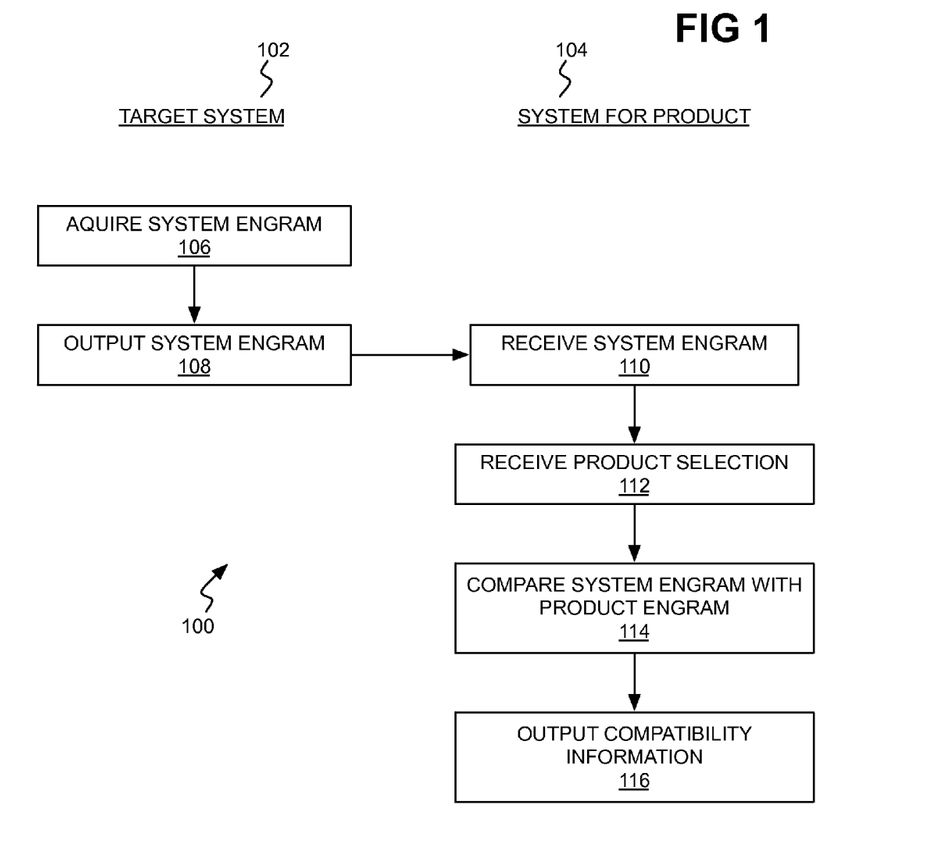
FIG. 1 is a flowchart of a method for determining compatibility information using a system engram and a product engram, according to a first embodiment of the invention.

FIG. 1 shows a method 100 for determining compatibility information using a system engram and a product engram, according to a first embodiment of the invention. The method 100 is divided into two columns. In the left column, a target system 102 can perform parts 106 and 108. In the right column, a system 104 for a product, which is also referred to as a product system 104, can perform parts 110, 112, 114, and 116. The order in which parts 106, 108, 110, 112, 114, and 116 can vary as compared to that indicated in FIG. 1. As just one example, the order in which parts 110 and 112 are performed can be reversed.

The target system 102 is the system for which compatibility information is to be determined in relation to a product. The product system 104 is the system that determines the compatibility information in the embodiment of FIG. 1. Each of the systems 102 and 104 may be or include a computing device, such as a desktop or a laptop computer, or another type of computing device.

A system engram is acquired at the target system 102 (106). In one embodiment, the system engram is acquired by running an engram acquisition computer program on the target system 102. In another embodiment, the system engram is acquired by running the engram acquisition computer program on a computing device communicatively connected to the target system 102. The device that runs the engram acquisition computer program is referred to as a first processing device, and is that which can perform both parts 106 and 108.

The system engram is an encoding of an existing configuration of the target system 102. The existing configuration of the target system 102 can include in whole or in part the hardware and/or software of the system 102. For example, as to the hardware of the target system 102, this hardware can include processor type and speed; memory type and speed; graphics adapter type, speed, and memory; storage device type, capacity, and available capacity; and so on. As to the software of the target system 102, this software can include operating system type, version, and patches installed; application program types, versions, and patches installed; and so on.

To acquire the system engram, therefore, the existing configuration of the target system 102 is determined, and then a system engram is generated in correspondence with the existing configuration. To determine the existing configuration, the acquisition computer program may scan the target system 102 to determine the current hardware and/or software of the system 102. Alternatively, the acquisition computer program may permit a user to manually select which hardware and/or software is currently installed on the target system 102.

The system engram is then generated based on the existing configuration of the target system 102. The system engram may be a series of bits, for instance, where each bit indicates whether or not a given hardware or software component to which the bit corresponds is installed on the target system 102. The patent application that has been incorporated by reference above described one manner by which the system engram can be generated.

The system engram is output by the first processing device (108). As a first example, a hardcopy of the system engram may be printed. The hardcopy may represent the system engram as a barcode, or another type of encoding that can be subsequently optically read or received. As a second example, the system engram may be stored as data on an electronic medium. For instance, the electronic medium may be a flash drive, or an electronic device that includes an electronic medium, such as a smartphone, and so on. The electronic medium may be user-removably physically attached to the first processing device, or it may be in wireless communication with the first processing device, such as via Bluetooth, Wi-Fi, and so on.

As a third example, the system engram may be electronically transmitted over a network from the first processing device to the product system 104. For instance, a user may have browsed to a web site maintained by the product system 104 over the Internet, at the target system 102. The user may download the engram acquisition computer program from the product system 104 to the target system 102, at which the computer program is executed. Alternatively, the user may use a web browsing computer program at the target system 102 to interact with the web site to manually select the existing configuration of the system 102. In either case, it is said that the system engram is ultimately output. Alternatively, it can be said that the product engram, which is described in detail later in the detailed description, is ultimately input.

The product system 104 receives the system engram (110). It is said that the product system 104 is or includes a second processing device, as distinguished from the first processing device that performs parts 106 and 108. In the embodiment of FIG. 1, the second process device is different from the first processing device. However, in other embodiments, as described in detail below, the first and second processing devices may be the same processing device.

The product system 104 may receive the system engram in a number of different ways, depending on how the system engram was output in part 108. For example, if a hardcopy of the system engram was printed, then the product system 104 optically reads this hardcopy, such as by optically reading a barcode or other indicia representing the system engram. As a second example, if the system engram was stored on an electronic medium, the product system 104 electronically receives the system engram from the electronic medium. The electronic medium may be user-removably attached to the product system 104, or the product system 104 may wirelessly retrieve the system engram from the electronic medium, which may include using near-field communications (NFC). As a third example, if the system engram was transmitted over a network to the product system 104, then the product system 104 receives the system engram from the first processing device over the network.

The product system 104 receives the selection of a product (112). The product may be the product that a user is interested in installing in relation to the target system 102. In some situations, receiving the product selection occurs implicitly. For instance, the product system 104 may be specific to the product in question. In a store, for example, there may be a product system 104 for the product that is of interest to the user. Therefore, by the product system 104 receiving the system engram in part 110, the product to which the product system 104 relates is automatically and implicitly selected.

In other situations, however, receiving the product selection occurs more explicitly. For instance, the product system 104 may provide a user interface by which the user selects the product that is of interest. This occurs particularly where the system engram was transmitted over the network to the product system 104. The user may select the product at the target system 102, via a web browsing computer program at the target system 102 interacting with a web site provided by the product system 104.

The system engram is compared with an engram for the product that has been selected, where this latter engram is referred to as a product engram (114). The product engram encodes a required configuration of a system, such as the target system 102, for the product to be compatibly installed in relation to this system. The required configuration can include the required hardware and/or the required software within a system for the product to be compatibly installed in relation to the target system. The product engram typically encodes the required configuration in the same or similar manner that the system engram encodes the existing configuration of the target system 102. In one embodiment, the comparison that is performed in part 114 is as described in the patent application that has been incorporated by reference above.

Once the comparison has been made, compatibility information is output (116). Different manners by which the compatibility information can be output are described later in the detailed description. The compatibility information includes the results of the comparison of the system engram with the product engram. As such, the compatibility information indicates whether the product can be compatibly installed in relation to the target system 102.

Figure 2:
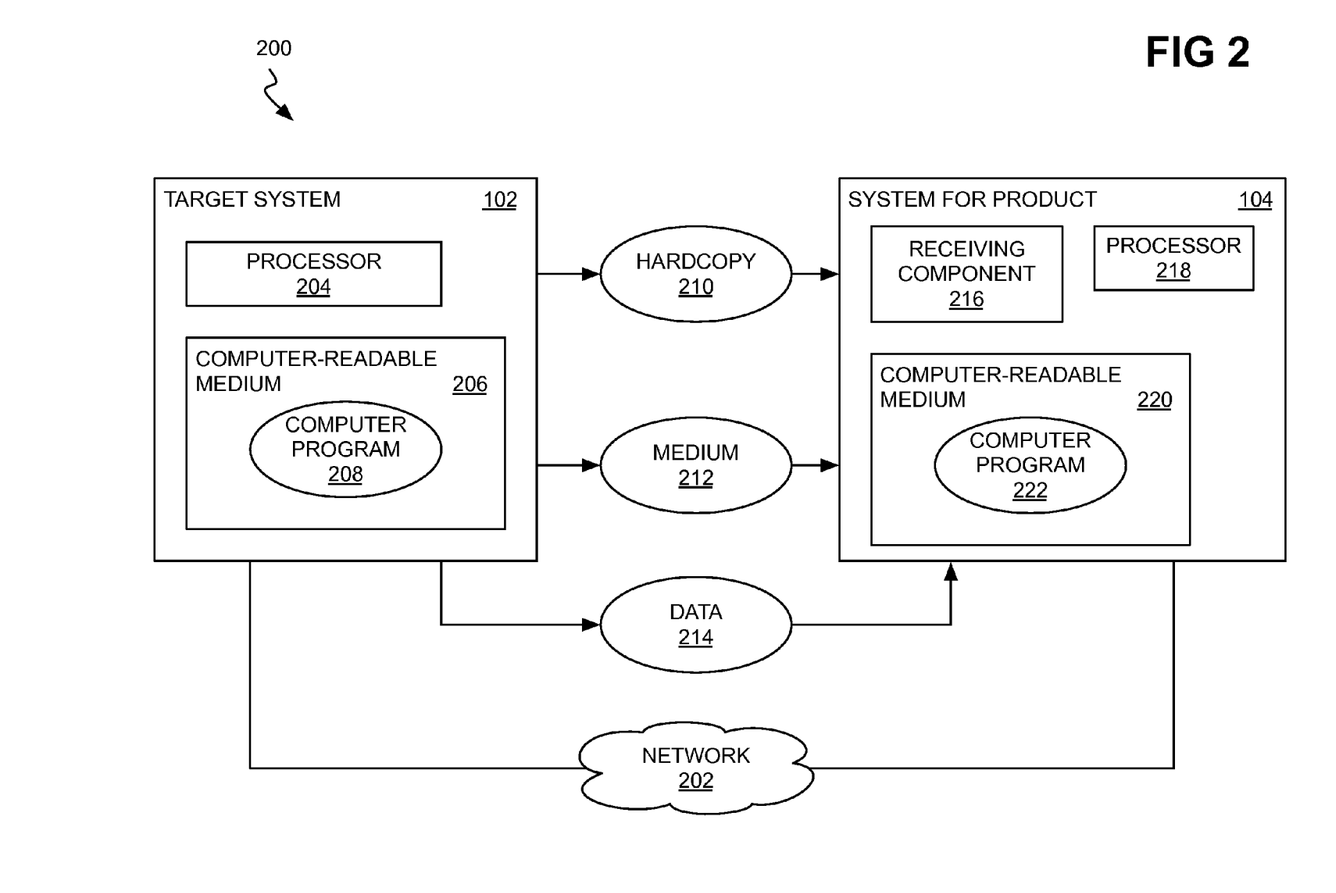
FIG. 2 is a diagram of a system in relation to which the method of FIG. 1 can be implemented, according to an embodiment of the invention.

FIG. 2 shows a system 200 in relation to which the method 100 can be implemented, according to an embodiment of the invention. The system 200 includes the target system 102 and the product system 104. The system 200 can also include a network 202, such as a local-area network (LAN), a wide-area network (WAN), an intranet, an extranet, a wired network, a wireless network, a telephony network, the Internet, and/or another type of network.

The target system 102 includes at least a processor 204 and a computer-readable medium 206 that stores a computer program 208. The processor 204 and the computer-readable medium 206 can be part of the first processing device that has been described. The computer-readable medium 206 may be or include a semiconductor memory, a hard disk drive, a volatile medium, and/or a non-volatile medium, among other types of computer-readable media.

The computer program 208 can be the system engram acquisition program that has been described. As such, execution of the computer program 208 by the processor 204 from the computer-readable medium 206 results in parts 106 and 108 of the method 100 being performed. Depending on the implementation, the system engram acquired in part 106 is output in part 108 in one of three ways: printed on a hardcopy 210; stored on an electronic medium 212; or, transmitted as data 214 over the network 202.

The product system 104 includes at least a receiving component 216, a processor 218, and a computer-readable medium 220 that stores a computer program 222. At least the processor 218 and the computer-readable medium 220 can be part of the second processing device that has been described. The computer-readable medium 220 may be or include a semiconductor memory, a hard disk drive, a volatile medium, and/or a non-volatile medium, among other types of computer-readable media.

The receiving component 216 can be an optical reading mechanism to optically read the hardcopy 210 of the system engram that has been printed. The receiving component 216 can alternatively be a communication mechanism to electronically receive the system engram from the electronic medium 212 upon user-removable attachment to the product system 104 and on which the system engram has been stored. The receiving component 216 can alternatively still be a different communication mechanism to electronically receive the system engram from the electronic medium 212 in a wireless manner. Finally, the receiving component 216 can be a network mechanism to electronically receive the data 214 including the system engram over the network 202.

Execution of the computer program 222 by the processor 218 from the computer-readable medium 220 results in parts 110, 112, 114, and 116 of the method being performed. As such, the computer program 222 causes the receiving component 216 to receive the system engram in part 110, and receives the product selection in part 112. The computer program 224 further performs the comparison in part 114, and outputs the compatibility information in part 116.

The target system 102 is typically not collocated with the product system 104. The target system 102 may be communicatively connected to the product system 104 over the network 202, such that the data 214 including the system engram is transmitted from the former to the latter. As another scenario, the target system 102 may be located at a user's home or workplace, and the product system 104 may be located in a store. In this scenario, the user brings the hardcopy 210 or the electronic medium 212 including the system engram to the store, for reading or receiving by the product system 104.

In the embodiment of the invention that has been described in relation to FIGS. 1 and 2, the engram comparison is performed by a product system 104. As such, the user of the target system 102 cannot take advantage of this embodiment unless the retailer has provided such a product system 104. In another embodiment, however, the engram comparison is performed by an electronic device that is under control of the user. As such, the user may be able to take advantage of this embodiment even if the retailer has not provided a product system 104.

Figure 3:
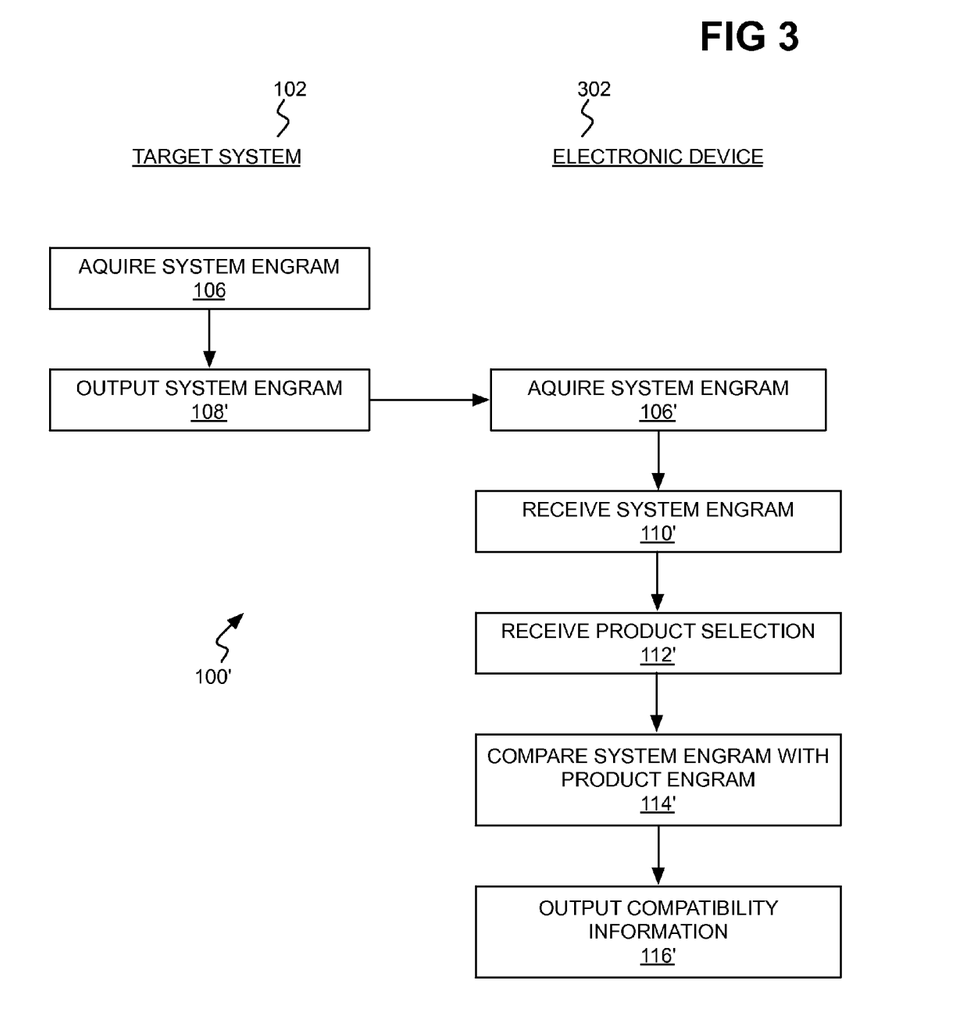
FIG. 3 is a flowchart of a method for determining compatibility information using a system engram and a product engram, according to a second embodiment of the invention.

FIG. 3 shows a method 100' for determining compatibility information using a system engram and a product engram, according to such a second embodiment of the invention. The method 100' is divided into two columns. In the left column, the target system 102 can perform parts 106 and 108'. In the right column, an electronic device 302 can perform parts 106' 110', 112', 114', and 116'. Like-numbered parts between the methods 100 and 300 that are primed in the method 300 are performed similarly in the method 300 as they are in the method 100. Furthermore, the order in which parts 106, 106' 108', 110', 112', 114', and 116' can vary as compared to that indicated in FIG. 3. As just one example, the order in which parts 110' and 112' are performed can be reversed.

The electronic device 302 is a device operable by the user, and is typically the user's own electronic device. The electronic device 302 is typically a portable electronic device. For instance, the electronic device 302 may be a smartphone, a handheld computer, or another type of electronic device. The electronic device 302 may be considered at least in some contexts a system, such as within the context of the claims presented at the end of this patent application.

Two implementations are explicitly depicted in FIG. 3. In one implementation, the system engram is acquired at the target system 102 (106), such as by the target system 102 running an engram acquisition computer program. In this implementation, the target system 102 is the first processing device that has been described. The target system 102 in this implementation outputs the system engram (108') in a wired or wireless manner, and the electronic device 302 receives the system engram (110') in a corresponding manner. In this implementation, the electronic device 302 is the second processing device that has been described, and which is a different device from the first processing device and is not part of the target system 102, whereas by comparison, the first processing device is part of or is the target system 102.

In another implementation, the system engram is acquired by the electronic device 302 (106'), such as by the electronic device 302 running the engram acquisition computer program. For instance, the electronic device 302 may be communicatively connected to the target system 102 in a wired or a wireless manner, so that the device 302 can run the engram acquisition computer program in relation to the target system 102. It can be said that acquisition of the system engram by the electronic device 302 is commensurate with the device 302 receiving the system engram in this implementation. In this implementation, the electronic device 302 is both the first and the second processing devices that have been described.

The electronic device 302 in either implementation receives selection of a product (112'). The product may be the product that the user is interested in stalling in relation to the target system 102. For example, a user may cause the electronic device 302 to optically read a printed hardcopy of the product engram, or a printed hardcopy of an indicia, such as a barcode, that the device 302 can then use to look up the product engram in a database. By virtue of the electronic device 302 performing this optical reading, the product is selected.

As a second example, the user may removably attach the electronic device 302 to an electronic medium for the product (or vice-versa) to electronically retrieve the product engram, or an identifier of the product that the device 302 can then use to look up the product engram in a database. As a third example, the electronic device 302 may electronically receive the product engram from such an electronic medium in a wireless manner, such as via NFC, Wi-Fi, Bluetooth, and so on. In both these examples, the electronic medium may be specific to the product, and may, for instance, be located near or at a product display for the product in a store. By virtue of the user attaching the electronic device 302 to the electronic medium or the device 302 wirelessly communication with the medium, the product is selected.

As a fourth example, the electronic device 302 may receive user input as to a product identifier of the product or the product engram itself to select the product in question. Where the user selects or enters the product identifier at the electronic device 302, the device 302 can use this information to look up the product engram for the product in a database. Such a database may be maintained at the electronic device 302 itself, or may be maintained remotely, such that the device 302 interacts with the database to retrieve the product engram.

The system engram is compared with the product engram (114'), as before. The compatibility information is then output (116'), also as before. The difference between parts 114' and 116' of the method 300 and parts 114 and 116 of the method 100 is that the electronic device 302 performs parts 114' and 116' in the method 300, whereas the product system 104 performs parts 114 and 116 in the method 100.

Figure 4A:
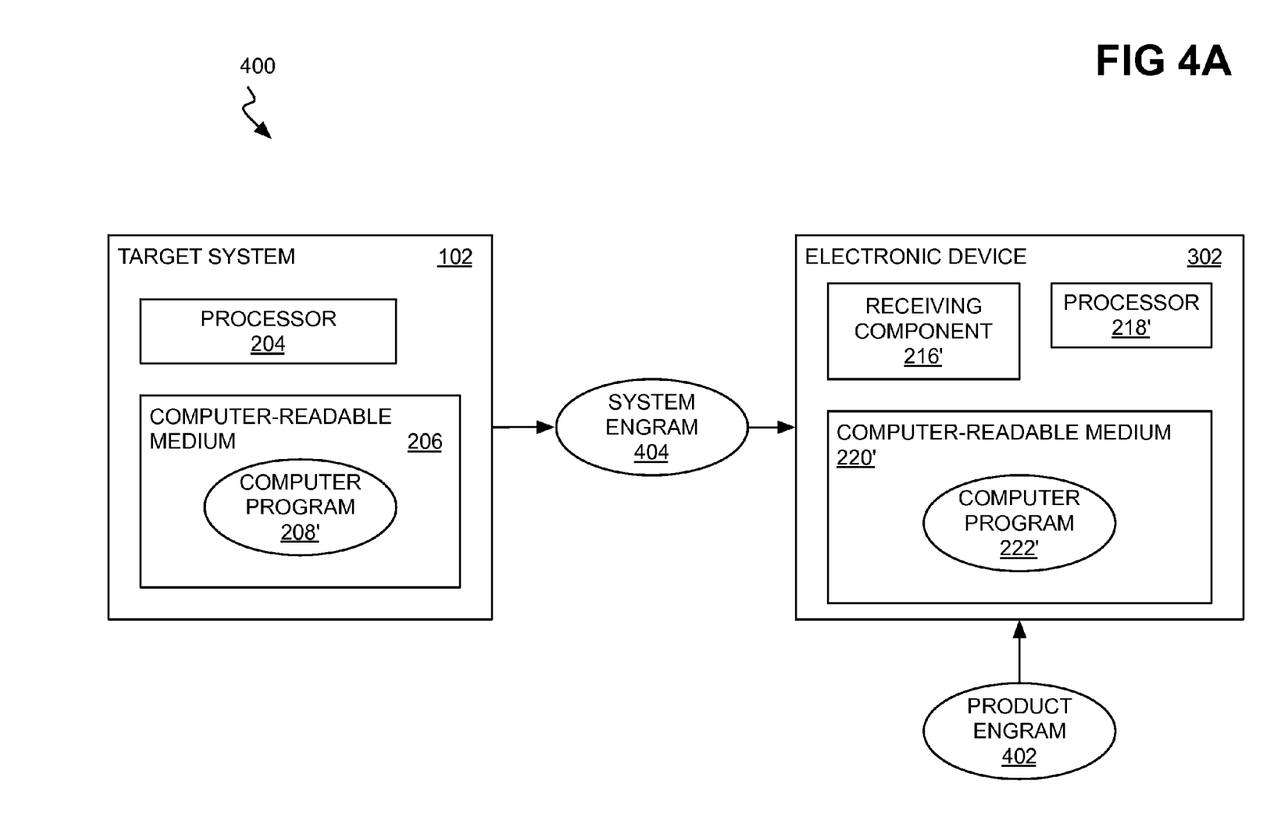
FIGS. 4A and 4B are diagrams of different implementation of a system in relation to which the method of FIG. 3 can be implemented, according to an embodiment of the invention.
Figure 4B:
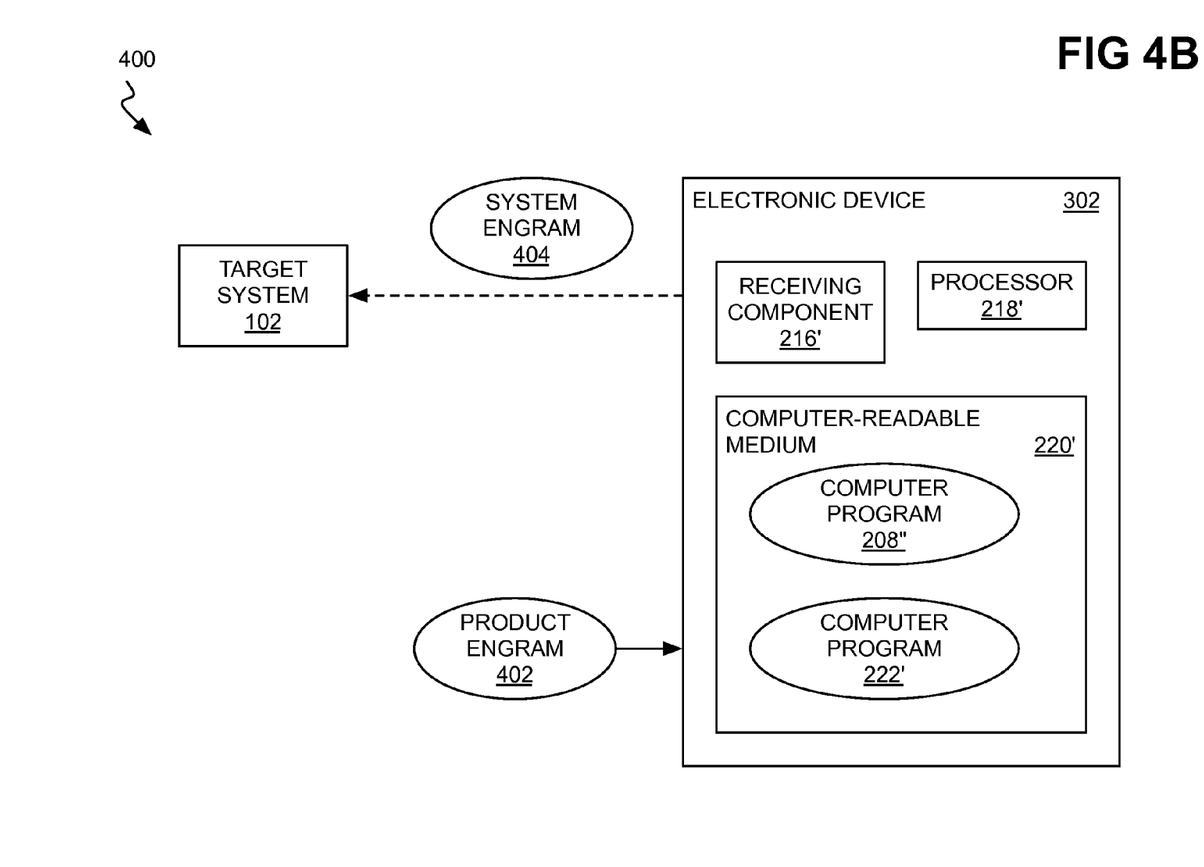

FIGS. 4A and 4B each shows an implementation of a system 400 in relation to which the method 100' can be implemented, according to an embodiment of the invention. In both FIGS. 4A and 4B, the system 400 includes the target system 102 and the electronic device 302. The difference between the implementations of FIGS. 4A and 4B is how the system engram 404 is received by the electronic device 302.

In the implementation of FIG. 4A, the target system 102 includes a computer program 208', which is executed by the processor 204 from the computer-readable medium 206 to perform parts 106 and 108' of the method 100' to acquire and output a system engram 404 to the electronic device 302. In this respect, the computer program 208' is similar to the computer program 208 of the system 200 that has been described. However, whereas the computer program 208 outputs the system engram to the product system 104, the computer program 208' outputs the system engram 404 to the electronic device 302.

In the implementation of FIG. 4B, the electronic device 302 includes a similar computer program 208". The computer program 208" performs part 106' of the method 100'. As such, the computer program 208" is similar to the computer program 208 of the system 200 and to the computer program 208', but is executed on the electronic device 302 to acquire the system engram 404 of the target system 102, instead of being executed on the target system 102 itself.

In both the implementation of FIG. 4A and the implementation of FIG. 4B, the electronic device 302 includes a receiving component 216', a processor 218', and a computer-readable medium 220', which are similar to their non-primed counterparts of the system 200. The receiving component 216' receives the product engram 402 in both implementations, and also receives the system engram 404 in the implementation of FIG. 4A. The receiving component 216' can otherwise be implemented as has been described in relation to its non-primed counterpart with respect to the system 200, but with respect to both the product engram 402 and the system engram 404.

The computer-readable medium 220' stores the computer program 222' in both implementations, and also the computer program 208" in the implementation of FIG. 2B. The processor 218' executes the computer programs 208" and/or 222' from the computer-readable medium 220'. The computer program 222' performs parts 110', 112', 114', and/or 116' of the method 100'.

In the embodiment of the invention that has been described in relation to FIGS. 3, 4A, and 4B, then, the engram comparison is performed by an electronic device 302 that may be under control of the user, as compared to by a product system 104 that is typically not under control of the user. As such, the user may be able to take advantage of this embodiment even if the retailer has not provided a product system 104. A user may store the system engram 404 on his or her own electronic device 302, and then take this device 302 to a store. The user may then use the electronic device 302 to obtain a product engram of a desired product being sold at the store, so that the user can assess whether the product is compatible with the target system 102, even if the retailer has not provided a product system 104.

Both embodiments of the invention that have been described—that of FIGS. 1 and 2 and that of FIGS. 3, 4A, and 4B—can be employed in an online shopping context as well as in a physical shopping context. In the former, a user may be shopping using a web browser or other computer program to connect to a web site or other online presence by a retailer. In the latter, a user may be shopping by physically traveling to a store. In either context, embodiments of the invention permit a user to determine whether a desired product is compatible with a user's target system 102.

Figure 5:
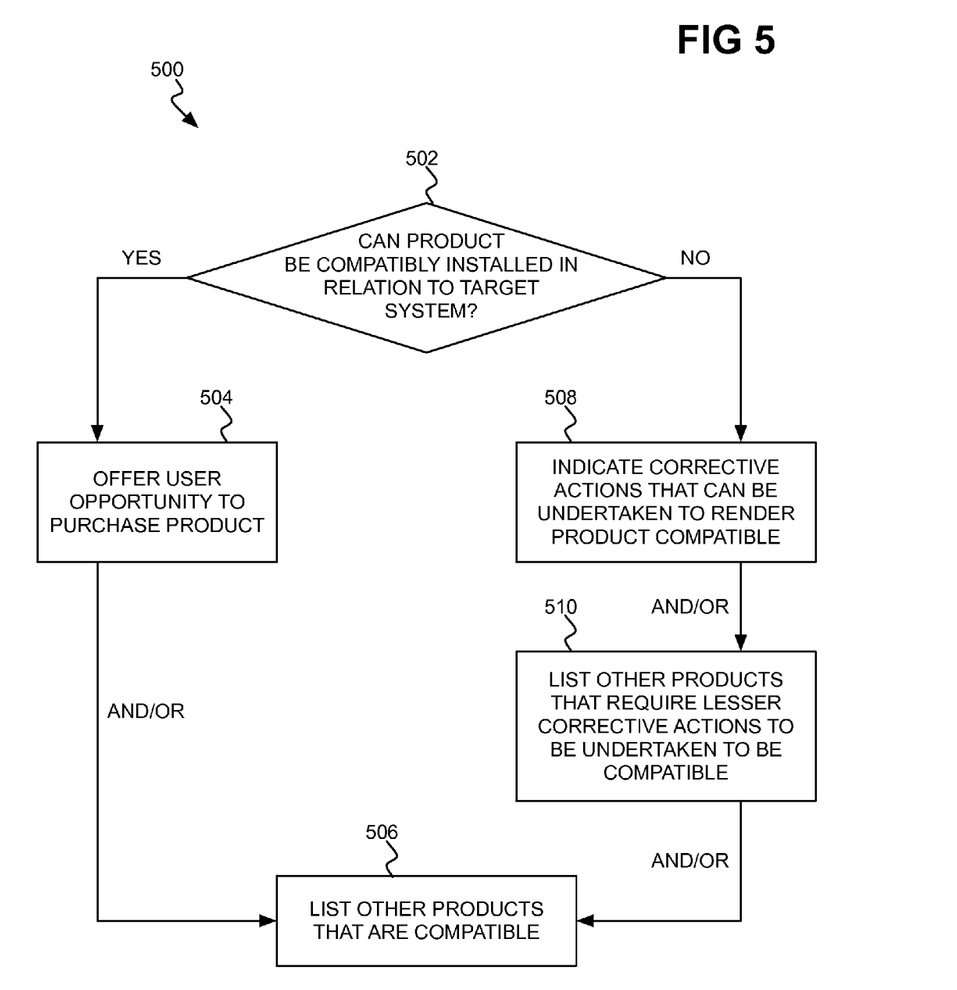
FIG. 5 is a flowchart of a method to output compatibility information within the method of FIG. 1 or FIG. 3, according to an embodiment of the invention.

In both the method 100 and 100', the compatibility information of the product in relation to the target system 102 is output. Such output can be achieved in a variety of different ways. FIG. 5 shows a method 500 to output the compatibility information, according to an embodiment of the invention. It is noted that the compatibility information includes one of two conclusions: either the product can be compatibly installed in relation to the target system 102, or it cannot be compatibly installed in relation to the system 102.

If the product can be compatibly installed in relation to the target system 102 (502), then outputting the compatibility information can include one or more of the following. The user may be offered an opportunity to purchase the product (504). Alternatively, or additionally, a list of other products that are also compatible with the target system 102 may be provided (506). For instance, product engrams for a number of other products may be compared to the system engram for the target system 102, and those products that are deemed compatible with the system 102 are listed.

If the product cannot be compatibly installed in relation to the target system 102 (502), then outputting the compatibility information can include one or more of the following. One or more corrective actions that can be undertaken to render the product compatible with the target system 102 may be indicated to the user (508). For example, the user may be informed that additional memory has to be installed within the target system 102 before the desired product can be compatibly installed.

Additionally, or alternatively, a list of other products that are presently incompatible with the target system 102, but that require lesser corrective actions to be undertaken to become compatible, may be provided (510). For example, the product in question may be an advanced version of a computer-aided drafting (CAD) computer program. To compatibly install this computer program on the target system 102, thirty-two gigabytes of memory may have to first be installed within the system 102. However, a standard version of this same CAD computer program may only require that eight gigabytes of memory have to be installed within the target system 102 for the standard version of the CAD computer program to be compatibly installed on the system 102.

Furthermore, as before, a list of other products that are compatible with the target system 102 may be provided (506), as before. The user may be afforded an opportunity to purchase one or more of these products. Similarly, the user may be afforded an opportunity to purchase whatever products are necessary to perform the corrective actions in parts 508 and/or 510, as well as an opportunity to purchase the other products listed in part 510.

It is noted that the techniques disclosed herein can be implemented in relation to a single system that both is the target system and performs the methods that have been described. For instance, the single system in such an instance may be a computing device like a laptop computer, a desktop computer, a smartphone, or another type of computing device. This computing device would thus acquire a system engram of itself, acquire a product engram, perform a comparison of the two engrams, and so on, in accordance with the processes that have been described above.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
    receiving a system engram encoding an existing configuration of a target system, the existing configuration including one or more of hardware and software of the target system, the system engram originally acquired by a first processing device and received by a second processing device;
    implicitly receiving selection of a product by explicitly receiving a product engram for the product without having previously received the selection of the product, the product engram directly encoding a required configuration of the target system for the product to be compatibly installed in relation to the target system, the required configuration including one or more of required hardware and required software within the target system for the product to be compatibly installed in relation to the target system;
    comparing, by the second processing device, the system engram with the product engram;
    outputting, as compatibility information of the product with the target system, results of comparison of the system engram with the product engram, by the second processing device;
    where the product can be compatibly installed in relation to the target system, one or more of:
        offering, by the second processing device, a user an opportunity to purchase the product;
        listing, by the second processing device, first other products that can be compatibly installed in relation to the target system;
    where the product cannot be compatibly installed in relation to the target system, one or more of:
        indicating, by the second processing device, one or more first corrective actions that can be undertaken in relation to the target system for the product to be able to be compatibly installed in relation to the target system;
        listing, by the second processing device, the first other products that can be compatibly installed in relation to the target system;
        listing, by the second processing device, second other products that cannot be compatibly installed in relation to the target system but that require one or more second corrective actions to be undertaken in relation to the target system for the second other products to be able to be compatibly installed in relation to the target system, where the second corrective actions are less costly than the first corrective actions.

2. The method of claim 1, wherein the first processing device is part of the target system and is a different processing device from the second processing device.

3. The method of claim 1, wherein receiving the system engram comprises one of:
    optically reading a hardcopy of the system engram that has been printed by the first processing device;
    electronically receiving the system engram from an electronic medium user-removably attached to the second processing device and onto which the system engram has been electronically stored by the first processing device;
    electronically receiving the system engram from the electronic medium in a wireless manner;
    electronically receiving the system engram over a network from the first processing device.

4. The method of claim 1, wherein the first processing device is one of a different processing device from and a same processing device as the second processing device, and is one of part of the target system and not part of the target system.

5. The method of claim 1, wherein receiving the system engram comprises one of:
electronically receiving the system engram by the second processing device in a wired or wireless manner from the target system, where the first processing device is a different processing device from the second processing device and is part of the target system, such that an engram acquisition computer program executed by the first processing device acquires the system engram;
acquiring the system engram by the second processing device executing the engram acquisition computer program, where the first processing device is a same processing device as the second processing device and is not part of the target system.

6. The method of claim 1, wherein implicitly receiving the selection of the product by explicitly receiving the product engram comprises one of:
optically reading a printed hardcopy of the product engram;
electronically receiving the product engram from an electronic medium to which the second processing device is user-removably attached, where the electronic medium is specific to the product;
electronically receiving the product engram from the electronic medium in a wireless manner, where the electronic medium is specific to the product.

7. A system comprising:
a processor;
a computer-readable medium to store a computer program executable by the processor; and,
a receiving component to receive:
a system engram encoding an existing configuration of a target system, the existing configuration including one or more of hardware and software of the target system, the system engram originally acquired by a processing device; and
implicit selection of a product by explicitly receiving a product engram for the product without having previously received selection of the product, the product engram directly encoding a required configuration of the target system for the product to be compatibly installed in relation to the target system, the required configuration including one or more of required hardware and required software within the target system for the product to be compatibly installed in relation to the target system,
wherein the computer program is to compare the system engram with the product engram, and is further to:
where the product can be compatibly installed in relation to the target system, one or more of:
offer a user an opportunity to purchase the product;
list first other products that can be compatibly installed in relation to the target system;
where the product cannot be compatibly installed in relation to the target system, one or more of:
indicate one or more first corrective actions that can be undertaken in relation to the target system for the product to be able to be compatibly installed in relation to the target system;
list the first other products that can be compatibly installed in relation to the target system;
list second other products that cannot be compatibly installed in relation to the target system but that require one or more second corrective actions to be undertaken in relation to the target system for the second other products to be able to be compatibly installed in relation to the target system, where the second corrective actions are less costly than the first corrective actions.

8. The system of claim 7, wherein the receiving component comprises one of:
an optical reading mechanism to optically read a hardcopy of the system engram that has been printed by the processing device;
a first communication mechanism to electronically receive the system engram from an electronic medium user-removably attached to the system and onto which the system engram has been electronically stored by the processing device;
a second communication mechanism to electronically receive the system engram from the electronic medium in a wireless manner;
a network mechanism to electronically receive the system engram over a network from the processing device.

9. The system of claim 7, wherein the receiving component is to receive the system engram by one of:
electronically receiving the system engram in a wired or wireless manner from the target system, where the processing device is not part of the system and is part of the target system, such that an engram acquisition computer program executed by the processing device acquires the system engram;
acquiring the system engram by the processor executing the engram acquisition computer program, where the processing device is part of the system and is not part of the target system.

10. The system of claim 7, wherein the receiving component comprises one of:
an optical reading mechanism to optically read a printed hardcopy of the product engram;
a first communication mechanism to electronically receive the product engram from an electronic medium to which the system is user-removably attached, where the electronic medium is specific to the product;
a second communication mechanism to electronically receive the product engram from the electronic medium in a wireless manner, where the electronic medium is specific to the product.

11. A computer program product comprising:
a storage memory device storing computer-readable code executable by a second processing device, the computer-readable code comprising:
first computer-readable code to receive a system engram encoding an existing configuration of a target system, the existing configuration including one or more of hardware and software of the target system, the system engram originally acquired by a first processing device;
second computer-readable code to compare the system engram with a product engram;
third computer-readable code to implicitly receive selection of a product by explicitly receiving the product engram for the product without having previously received the selection of the product, the product engram directly encoding a required configuration of the target system for the product to be compatibly installed in relation to the target system, the required configuration including one or more of required hardware and required software within the target system for the product to be compatibly installed in relation to the target system; and fourth computer-readable code to:
  where the product can be compatibly installed in relation to the target system, one or more of:
    offer a user an opportunity to purchase the product;
    list first other products that can be compatibly installed in relation to the target system;
  where the product cannot be compatibly installed in relation to the target system, one or more of:
    indicate one or more first corrective actions that can be undertaken in relation to the target system for the product to be able to be compatibly installed in relation to the target system;
    list the first other products that can be compatibly installed in relation to the target system;
    list second other products that cannot be compatibly installed in relation to the target system but that require one or more second corrective actions to be undertaken in relation to the target system for the second other products to be able to be compatibly installed in relation to the target system, where the second corrective actions are less costly than the first corrective actions.

12. The computer program product of claim 11, wherein the first computer-readable code is to receive the system engram by one of:
  causing an optical reading mechanism to optically read a hardcopy of the system engram that has been printed by the first processing device;
  causing a first communication mechanism to electronically receive the system engram from an electronic medium user-removably attached to the second processing device and onto which the system engram has been electronically stored by the first processing device;
  causing a second communication mechanism to electronically receive the system engram from the electronic medium in a wireless manner;
  causing a network mechanism to electronically receive the system engram over a network from the first processing device.

13. The computer program product of claim 11, wherein the first computer-readable code is to receive the system engram by one of:
  causing a communication mechanism to electronically receive the system engram in a wired or wireless manner from the target system, where the first processing device is a different processing device from the second processing device and is part of the target system, such that an engram acquisition computer program executed by the first processing device acquires the system engram;
  acquiring the system engram by executing the engram acquisition computer program, where the first processing device is a same processing device as the second processing device and is not part of the target system.

14. The computer program product of claim 11, wherein the third computer-readable code explicitly receives the product engram by one of:
  causing an optical reading mechanism to optically read a printed hardcopy of the product engram;
  causing a first communication mechanism to electronically receive the product engram from an electronic medium to which the second processing device is user-removably attached, where the electronic medium is specific to the product;
  causing a second communication mechanism to electronically receive the product engram from the electronic medium in a wireless manner, where the electronic medium is specific to the product.

\* \* \* \* \*